Aug. 6, 1929.                W. S. SMITH                1,723,896
                                SCALE
                         Filed April 2, 1926         2 Sheets-Sheet 1
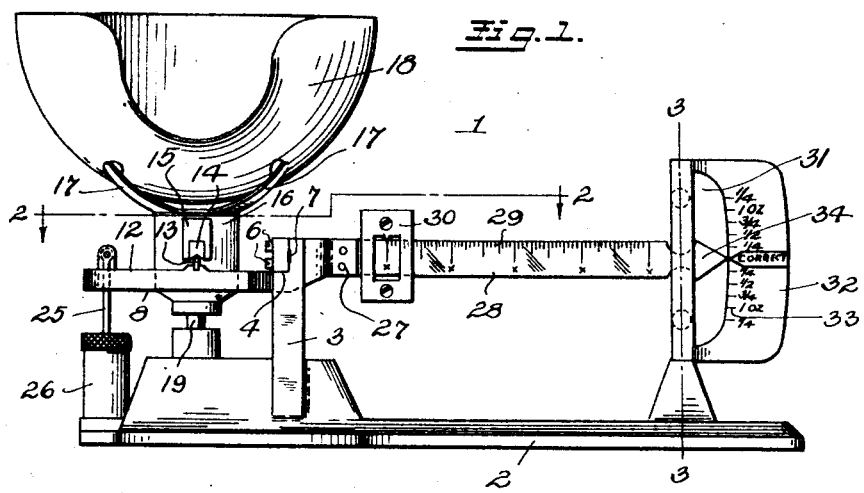
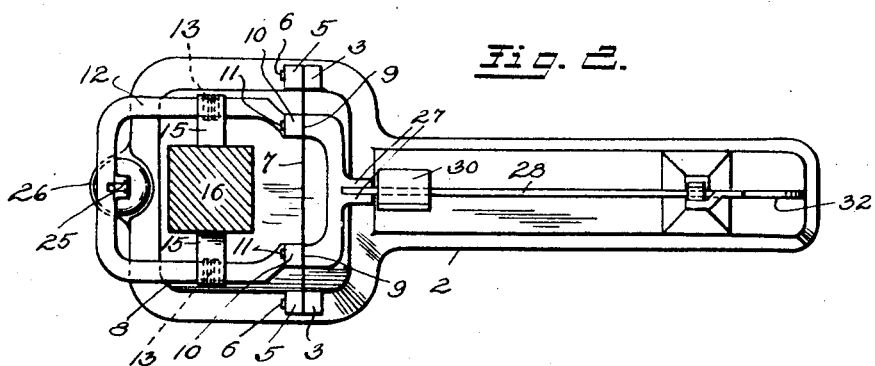
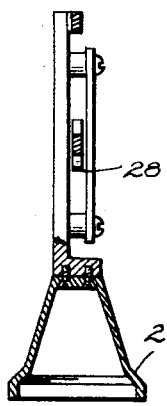
Inventor
Walter S. Smith
By W. D. McDowell
Attorney Aug. 6, 1929.  W. S. SMITH  1,723,896
SCALE
Filed April 2, 1926   2 Sheets-Sheet 2
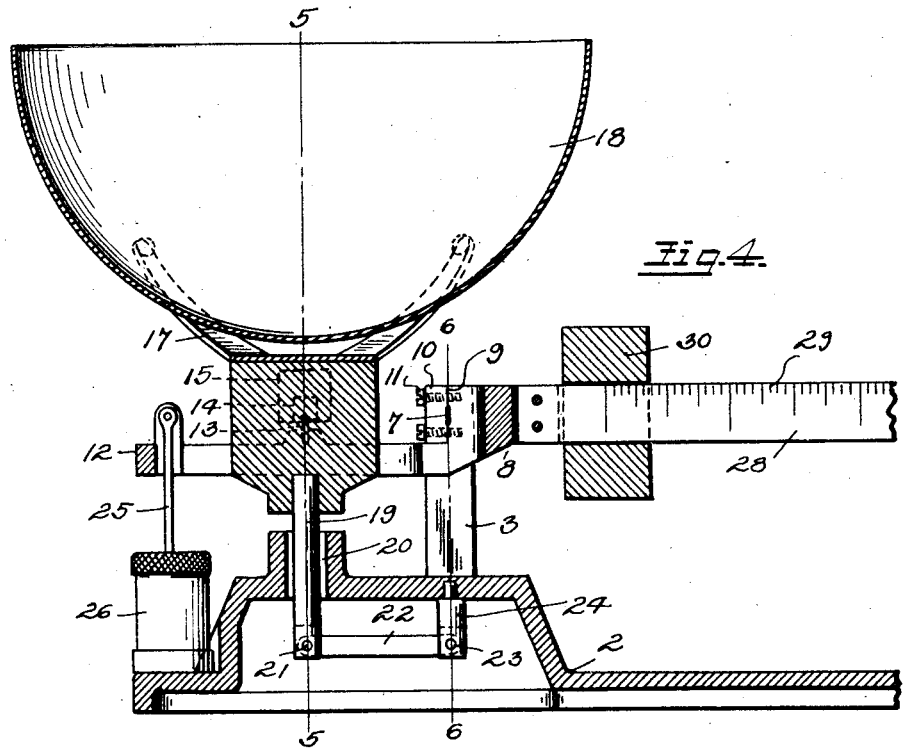
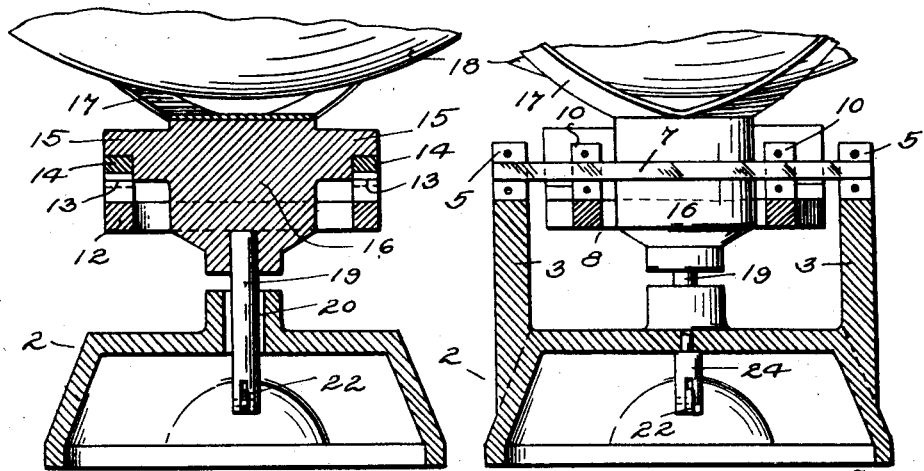
Inventor
Walter S. Smith
By W. D. McDowell.
Attorney Patented Aug. 6, 1929.

1,723,896

UNITED STATES PATENT OFFICE.

WALTER S. SMITH, OF COLUMBUS, OHIO.

SCALE.

Application filed April 2, 1926. Serial No. 99,230.

This invention relates to improvements in weighing scales, and has for its primary object to provide a weighing scale characterized by the simplicity and durability of its construction, and its extreme sensitiveness in denoting under and over weight applied to the receiver of the scale.

The principal object of the invention resides in the provision of a scale wherein the weighing beam or lever has a fulcrum support in the form of a torsional strip mounted in the center of balance of the beam, and wherein the outer end of the beam is formed to comprise an indicator which by comparison with an associated and graduated surface is utilized to enable the operator to determine exact weight balances.

With these and other objects in view, as will appear as the description proceeds, the invention consists in the novel features of construction, combinations of elements and arrangements of parts hereinafter to be fully described and pointed out in the appended claims.

In the accompanying drawings:

Figure 1 is a side elevation of the improved scale comprising the present invention, Figure 2 is a horizontal sectional view taken on the line 2—2 of Figure 1, Figure 3 is a vertical transverse sectional view on the line 3—3 of Figure 1, Figure 4 is an enlarged vertical sectional view taken through the torsional fulcrum support of the scale beam and associated parts, Figure 5 is a vertical transverse section on the line 5—5 of Figure 4, Figure 6 is a similar view on the line 6—6 of Figure 4.

Referring more particularly to the drawings, the numeral 1 designates my improved scale in its entirety. In the specific form of the invention illustrated, the scale is formed to comprise a base 2, preferably in the form of a metallic casting or of a stamping, and from which arises a pair of transversely spaced vertically disposed posts 3. The upper ends of these posts are recessed as at 4, for the reception of clamping blocks 5, which are secured to the posts by means of screws or their equivalent 6. The blocks 5 are utilized to frictionally clamp to the posts a transversely extending thin metallic strip or band, ordinarily known in the trade as a torsion strip, said strip being designated by the numeral 7. By means of the clamping blocks 5 the strip is securely held at its end so that its intermediate portions may be twisted, but due to the torsional elasticity of the strip the latter when released will tend to return to its normal condition wherein the strip occupies a vertical plane extending horizontally between the upper end of the posts 3.

The beam 8 of the scale, which in this instance is of the simple lever type, has its intermediate portions vertically shouldered as at 9 to engage with the intermediate portions of the strip 7, and clamping pieces 10 are separably carried by the beam and secured thereto by means of screws or the like 11 to securely mount the beam upon the fulcrum support provided by the strip 7. The inner end of the beam is formed to comprise a substantially rectangular frame portion 12, which at a point intermediate of its length is provided with a pair of transversely aligned upstanding knife edges 13, upon which rest hardened steel blocks 14 carried by horizontally and laterally projecting studs 15 formed with the body portion 16 of a weight receiver. In this instance the upper portion of the receiver is provided with supporting arms 17 which removably receive a pan or platter 18, adapted for the reception of the bodies or materials to be weighed.

In the lower portion of the body 16 there is fitted a depending stem 19 which projects through an opening 20 formed in the upper portion of the scale base 2. The lower end of the stem is suitably yoked and has pivoted thereto as at 21 one end of a check rod 22, extending parallel with the beam 8. The other end of the check rod is pivoted as at 23 in connection with a supporting post 24, depending from the under side of the base 2. The pivot 23 is located in vertical alignment with the fulcrum support for the beam 8, whereby the check rod is constantly maintained in parallelism with the beam 8 throughout all of the working positions of the latter. The frame portion 12 of the beam, beyond the weight support, is connected with the piston rod 25 of a dash pot 26, mounted on the base 2, the dash pot being utilized for the customary purpose of stabilizing the oscillations of the beam.

The inner end of the frame portion 12 of the beam, adjacent to the torsion strip 7 and on the opposite side thereof as regards the weight support, is provided with a pair of spaced lugs 27 between which is received and secured the outer end or bar portion 28 of the beam. It will be understood, however, that the frame portion 12 and the bar portion 28 are rigidly connected and formed so as to constitute a unitary feed structure. The bar 28 is preferably graduated as at 29, and has slidably mounted thereon an adjustable poise 30, which may be set at any desired position throughout the length of the bar 28 so as to unbalance the beam and permit the latter to be restored to balance by the application of material to the weight pan 18.

The extreme outer end of the bar or beam is mounted for oscillation in a vertical slot 31 provided on an indicator plate 32. This plate, as shown in Figure 1, is suitably graduated as at 33 to indicate weights above and below a predetermined normal, and the extreme outer end of the bar 28 terminates in a pointer 34, which is movable closely adjacent the graduations 33 to provide for convenience and accuracy in plate reading. The slot 31 is of such length as to limit the oscillation of the beam within prescribed distances, and to present undue flexing on the part of the torsion strip.

In view of the foregoing it will be seen that the present invention provides a simple and economical form of scale for enabling exact weight to be readily determined or produced. It will be observed particularly that the beam itself provides its own indicator, there being no motion transmitting devices between the beam and a separate indicating mechanism, as has been heretofore proposed.

What is claimed is:

In a scale, a base, a pair of spaced fulcrum supports on said base, a beam including a substantially rectangular frame portion mounted for oscillation between said supports, one end of said frame being formed to include a socket for the reception of one end of a graduated bar and the other end of said frame being provided with a slotted projection, a dash pot on said base having its operating stem pivotally connected to said projection, and a weight receiver pivotally carried by said beam at a point intermediate to the fulcrum supports and said operating connection for said dash pot.

In testimony whereof I affix my signature.

WALTER S. SMITH.